Dec. 4, 1956 P. J. H. JANSSEN 2,773,189

CIRCUIT-ARRANGEMENT FOR SYNCHRONIZING AN OSCILLATOR TO A PILOT WAVE

Filed Oct. 28, 1952 2 Sheets-Sheet 1

INVENTOR
PETER JOHANNES HUBERTUS JANSSEN
BY [signature]
AGENT

Dec. 4, 1956 P. J. H. JANSSEN 2,773,189
CIRCUIT-ARRANGEMENT FOR SYNCHRONIZING
AN OSCILLATOR TO A PILOT WAVE
Filed Oct. 28, 1952 2 Sheets-Sheet 2

INVENTOR
PETER JOHANNES HUBERTUS JANSSEN
BY [signature]
AGENT

United States Patent Office 2,773,189

Patented Dec. 4, 1956

2,773,189

CIRCUIT-ARRANGEMENT FOR SYNCHRONIZING AN OSCILLATOR TO A PILOT WAVE

Peter Johannes Hubertus Janssen, Eindhoven, Netherlands, assignor to Hartford National Bank and Trust Company, Hartford, Conn., as trustee Application October 28, 1952, Serial No. 317,309

Claims priority, application Netherlands November 6, 1951

5 Claims. (Cl. 250—36)

This invention relates to circuit-arrangements for synchronizing an oscillator to a pilot wave, in which a wave from the oscillator and an oscillation derived from the pilot wave are supplied to a phase-comparison stage whose output voltage controls the oscillator frequency.

Such known circuit-arrangements for automatic frequency- and phase-control are endowed with several favourable properties.

Thus, for example, the oscillator frequency is comparatively insensitive to noise or other interfering signals occurring in the pilot wave.

Furthermore the oscillator wave remains synchronous with the control wave, provided the tendency to variation of the natural frequency of the oscillator, for example due to supply voltage variations, be not excessive.

If the natural frequency of the oscillator should tend to vary slightly, a variation of the relative phase of the oscillator wave and the pilot wave occurs, since a variation of the natural frequency of the oscillator involves a variation of the output voltage of the phase-comparison stage, said voltage variation compensating for the variation of the natural frequency of the oscillator.

If the oscillator is sufficiently stable, only small phase shifts occur between the oscillator wave and the pilot wave.

However, there is another cause of phase shifts i. e. drift of the frequency of the pilot wave.

If the frequency of the pilot wave varies, the frequency of the oscillator should also vary, if synchronism is to be maintained, so that the output voltage of the phase-comparison stage must acquire a different value.

Frequency variations of the pilot wave consequently involve variations of the relative phase of the pilot wave and of the oscillator wave.

Such phase variations may cause disturbing effects, for example in television receivers, where synchronisation of the line deflection of the beam of the cathode-ray tube is effected by means of an automatic frequency- and phase-control circuit-arrangement.

If, in this case, the frequency of the synchronisation signal and consequently the phase between this signal and the line deflection wave changes, this brings about a displacement in a horizontal direction of the image projected on the screen of the cathode-ray tube.

The present invention has for its object to mitigate the phase shift between the pilot wave and the oscillator wave on the occurrence of frequency variations of the pilot wave.

The circuit-arrangement according to the invention has the feature that the wave from the oscillator is supplied to the phase-comparision stage through a network which brings about a phase shift of the wave from the oscillator upon frequency variations of the pilot wave, said phase shift counteracting the phase shift between pilot wave and oscillator wave.

If, in a circuit-arrangement according to the invention, the frequency of the pilot wave varies, the oscillator frequency will also vary, the network provided in the supply circuit to the phase-comparison stage causing a phase shift to be deducted from the phase shift required to be brought about by the phase-comparison stage in the absence of the network.

In order that the invention may be readily carried into effect, it will now be described in greater detail with reference to the accompanying drawings, given by way of example, which represent one form of the circuit-arrangement according to the invention, and in which—

Figure 3:
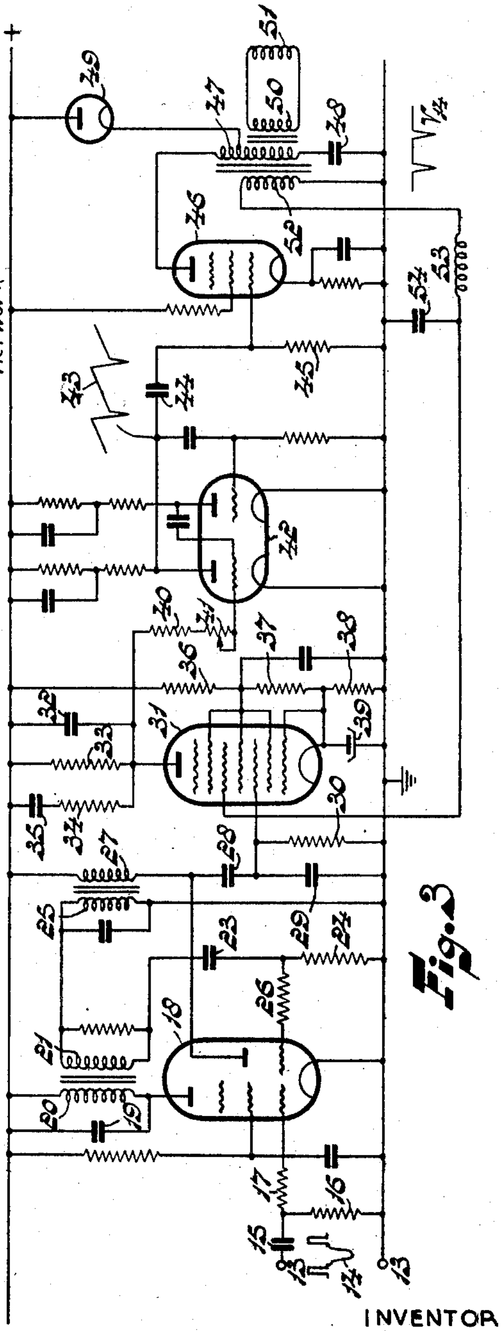
Figure 4:
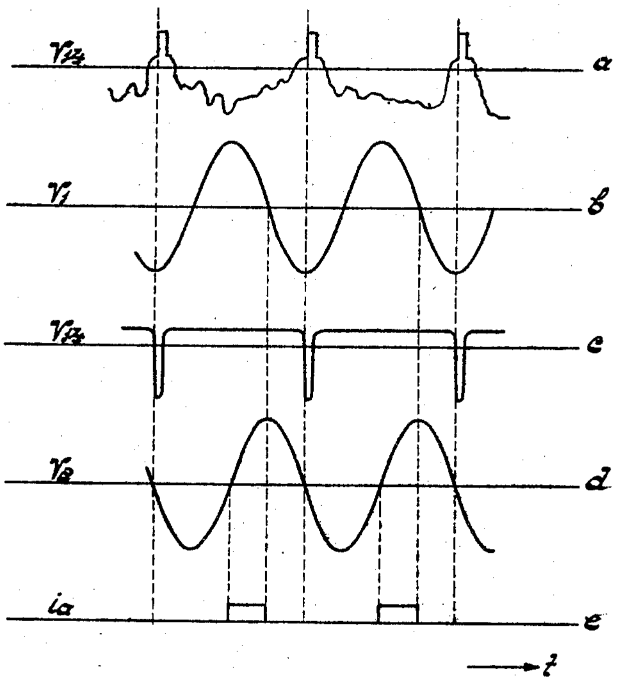

In Fig. 4 a number of voltages, occurring in the circuit-arrangement shown in Fig. 3, are shown as a function of time.

Figure 5:
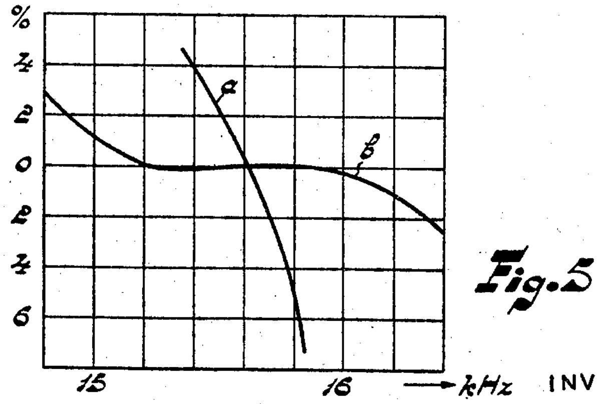

Fig. 5 shows the displacement of the raster on the picture tube of a television receiver as a function of the frequency of the line synchronizing pulses with two television receivers, one of which comprises a circuit-arrangement as shown in Fig. 3.

Figures 1, 2:
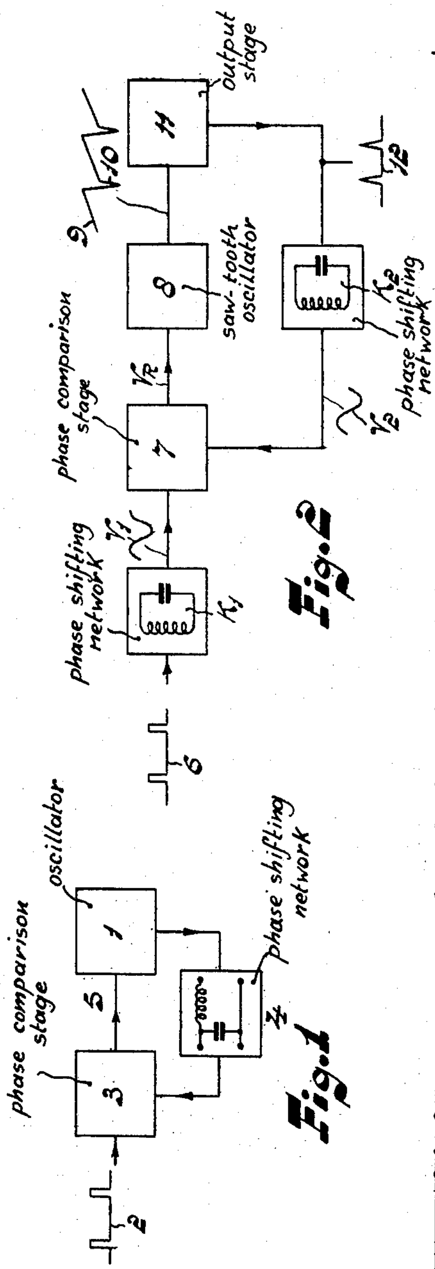
Fig. 1 is a block-diagram of a circuit-arrangement according to the invention, with reference to which its principle will be more fully explained.
Fig. 2 is a block-diagram of one form of the circuit-arrangement according to the invention, which is shown in greater detail in Fig. 3.

In the diagrammatically represented circuit-arrangement shown in Fig. 1, the line saw-tooth oscillator 1 of a television receiver (not shown), is to be synchronized with the line synchronizing pulses 2.

To this end the line synchronization signal 2 is supplied to a phase-comparison stage 3.

Through a circuit comprising a network 4 a wave from the line saw-tooth oscillator is moreover supplied to the phase-comparision stage.

The output voltage of the phase-comparison stage, which may be of known construction, is fed as a control voltage to the line saw-tooth oscillator 1 at 5.

If in this circuit-arrangement, in the absence of the network 4, the fundamental frequency of the line synchronizing pulses varies from $f_0$ to $f_0+\Delta f_0$, the frequency of the line saw-tooth oscillator 1 should also vary from $f_0$ to $f_0+\Delta f_0$ if the synchronism is to be maintained.

This is effected by causing the control voltage supplied by the phase-comparison stage 3 to alter by a given amount corresponding to a phase shift $\Delta\varphi$, where $\varphi$ represents the initial phase difference between the fundamental oscillation of the synchronizing pulses 2 and the fundamental oscillation of the line saw-tooth oscillator 1 at a frequency $f_0$.

The wave from the oscillator 1 is, however, supplied back to the phase-comparison stage 3 through the network 4.

This network which, as shown in the drawing, may consist of a low-pass filter comprising a series-inductance coil and a parallel capacitor, is tuned to the nominal fundamental frequency of the oscillator 1 and transmits only the wave of fundamental frequency of the line saw-tooth oscillator 1. If, for example, a saw-tooth voltage or a pulse voltage were taken from said oscillator, a substantially sinusoidal voltage would occur across the output terminals of the network, the frequency of the said sine voltage corresponding to the fundamental frequency of the derived voltage.

Initially, a voltage having a nominal frequency $f_0$ and a given phase angle $\varphi_0$ is consequently taken from the output terminals of said network.

If, however, the frequency of the oscillator 1 changes from $f_0$ to $f_0+\Delta f_0$ a voltage of a frequency $f_0+\Delta f_0$ and, moreover, a different phase angle $\varphi_1$ appears at the output terminals of the network, since a variation in frequency also involves a phase shift.

If this phase shift $\varphi_1-\varphi_0$ occurs in the correct direction and is exactly equal to the required phase shift $\Delta\varphi$ of the phase-comparison stage, the variation of the frequency of the line saw-tooth oscillator 1 which occurs upon variations of the frequency of the synchronizing pulses, will occur without involving any phase displacement.

If the phase shift $\varphi_1-\varphi_0$ is smaller than the required $\Delta\varphi$ a certain phase shift will remain between the pilot wave and the oscillator wave, and if $\varphi_1-\varphi_0$ is too large the ultimate phase displacement is of opposite sign to the phase displacement produced in the absence of the network 4.

In the circuit-arrangement shown diagrammatically in Fig. 2, the synchronizing pulses 6 are not supplied directly to the phase-comparison device 7 but by way of an LC-circuit $K_1$ which is tuned to the nominal fundamental frequency of the pulse voltage 6.

From the incoming synchronizing pulses having a nominal frequency $f_0$, a sine voltage $V_1$ is derived by means of the circuit $K_1$. For simplicity it will be assumed that said sine voltage is in phase with the synchronizing signals at the frequency $f_0$.

The sine voltage $V_1$ is supplied to the phase-comparison stage 7, wherein the phase is determined relatively to a second supplied voltage referred to hereinafter.

The control voltage $V_r$ set up at the output of stage 7 is fed to the line saw-tooth oscillator 8 which produces a saw-tooth voltage of the form shown at 9. It is pointed out that a pulse voltage 10 moreover occurs during the fly-back of the saw-tooth voltage 9.

This saw-tooth voltage is supplied to the device 11 comprising a tube, whose output circuit comprises the deflection coil for line deflection of the electron beam of the cathode-ray tube of the television receiver. In this coil a saw-tooth current is produced, and a pulse voltage occurs across the coil during the fly-back of said current.

The pulse voltage taken from said coil and indicated at 12 is supplied to a second LC-circuit $K_2$ which is tuned to the nominal fundamental frequency of the pulse voltage 12.

From this circuit $K_2$ a sine voltage $V_2$ is taken, which is supplied to the phase-comparison stage 7.

In conjunction with the fact that many of the conventional phase-comparison devices are most sensitive if a phase difference of about 90° exists between the two supplied voltages, it is postulated that at the nominal frequency $f_0$ the voltage $V_2$ lags by 90° behind the pulse voltage 12.

If the frequency of the synchronizing pulses 6 changes from $f_0$ to $f$, and $f \geqslant f_0$, a phase shift $\varphi_1$ is produced between said pulses and the voltage $V_1$ at which $\varphi_1$ is positive.

In this event a phase shift also occurs with the circuit $K_2$ in a manner such that for the frequency $f>f_0$ the voltage $V_2$ now lags by $90°+\varphi_2$ behind the pulse voltage 12 at which $\varphi_2$ is also positive.

The phase comparison device supplies a control voltage $V_R$, which depends upon the phase difference between the sine voltages $V_1$ and $V_2$, which phase difference is represented by $90°+\varphi_3$ and with which $\varphi_3$ is also positive for $f>f_0$.

The phase difference $\varphi_4$ between the synchronizing pulses 6 and the fly-back pulses 12 is then found from $$\varphi_4=\varphi_1+(90°+\varphi_3)-(90°+\varphi_2)$$

or $$\varphi_4=\varphi_1-\varphi_2+\varphi_3$$

When choosing the frequency dependency of said phase angles to be such that the relation $\varphi_1-\varphi_2+\varphi_3=0$ is practically satisfied, substantially no phase shift will be produced between the synchronizing pulses 6 and the fly-back pulses 12, so that frequency variations of the synchronizing signal will not cause displacement of the image projected on the picture tube of the television receiver.

In general, $\varphi_1$ and $\varphi_2$ do not linearly depend upon the frequency, so that complete avoidance of image displacement will only be feasible within a given frequency interval.

From the relation derived which, differently written, runs $\varphi_2=\varphi_1+\varphi_3$ it further follows that the variation of the phase as a function of the frequency with the circuit $K_2$ should be larger than with the circuit $K_1$, in other words the selectivity of the circuit quality of the circuit $K_2$ should exceed the circuit quality of the circuit $K_1$.

Since the phase angle $\varphi_3$ varies linearly with the frequency, the value of the circuit quality of the two circuits, with which for a given frequency variation the picture shift is just avoided, is determined by the requirement that the phase difference $\varphi_2-\varphi_1$ should vary substantially linearly with the frequency.

The greater the frequency difference $\Delta f$ is, for which the picture shift is to be compensated, the lower the circuit quality which can be used.

With a frequency variation of 2% in a particular type of phase-comparison device, the phase shift $\varphi_3$ was found to be about 7°, and then the circuit quality of the circuit $K_1$ should be approximately 6, 5 and that of $K_2$ approximately 10.

The quality Q of a circuit is $\omega_0RC$, where $$\omega_0=\frac{1}{\sqrt{LC}}=2\pi f_0$$

$f_0$ representing the natural frequency, L the selfinduction, C the capacity, and R the resistance of a parallel circuit, expressed in units of one and the same system.

A more elaborate diagram of one form of the circuit-arrangement according to the invention is shown in Fig. 3.

A detected television signal 14 is supplied with positive polarity of the synchronizing pulses by way of input terminals 13, capacitor 15 and resistors 16, 17 to the control grid of the pentode portion of tube 18, the synchronizing signal being separated in known manner from the picture signal, so that current passes in the pentode portion only during the occurrence of synchronizing pulses.

Since the synchronizing signal comprises not only line pulses, but also smoothing pulses and frame pulses, the latter being interrupted with double the line frequency, the line synchronizing pulses require to be separated.

To this end a differentiating network comprising a capacitor 19 and coil 20 is primarily provided in the anode circuit of the pentode portion.

The differentiated pulse mixture is transmitted, through coil 21 closely coupled to coil 20, to the control grid of the triode portion of tube 18. For this purpose coil 21 is connected in series with a capacitor 23 and the resistor 24 included in the control-grid circuit of the triode portion, and in addition with coil 25 referred to hereinafter.

The differentiated pulse mixture controlling, through resistors 24 and 26, the triode portion of tube 18 has a polarity such that the potential of the control grid is increased at instants coinciding with the leading edges of the line synchronizing pulses and, moreover, at instants coinciding with the leading edges of the smoothing pulses and with the trailing edges of the interruptions of the picture pulse and, in addition, with the leading edge of the picture pulse.

When current starts to flow through the triode at all these instants, the circuit $K_1$ which is here provided in the anode circuit of the triode and consists of the series connection of coil 27 and capacitors 28 and 29, is shock-excited at a number of desired instants, but also at a number of undesired instants, so that no pure sine voltage is set up across this circuit.

In order to prevent such incorrect shock-excitation of the circuit the voltage set up across coil 27, through the coupling coil 25, is supplied back again to the control grid circuit of the triode portion.

The differentiated pulse mixture is subsequently superposed on the voltage of the circuit, so that the control-grid voltage, which is subject to peak-detection as a result of the action of the grid-cathode space of the triode jointly with resistors 26, 24 and capacitor 23, just attains the desired maximum value at instants corresponding with the leading edges of the line synchronizing pulses, and attains its minimum value, which is located beyond the cut-off point of the triode, at undesired instants, with the result that a sine wave $V_1$ of line frequency occurs in the circuit $K_1$ consisting of the elements 27, 28 and 29.

Fig. 4*a* shows the variation of the television signal $V_1$ plotted as a function of time, Fig. 4*b* showing the sine voltage $V_1$.

That part of the voltage $V_1$ which occurs across capacitor 29 is applied through leak resistor 30 to the third grid of a multigrid tube 31 acting as a mixing detector and forming part of the phase-comparison stage which furthermore comprises an integrating network comprising the parallel-connection of three branches, one of which comprises a capacitor 32, the second comprises a resistor 33 and the third comprises the series-connection of a resistor 34 and a capacitor 35.

This network is provided in the anode circuit of tube 31. By means of the potentiometer comprising resistors 36, 37 and 38 from which also the voltage for the three screen grids of the tube is taken, the cathode of tube 31, which is moreover connected to earth by way of a capacitor 39, is positively biased relatively to the third and fifth grid.

The first grid is electrically connected to the cathode in order to produce a maximum cathode current in the tube to permit the latter, if the further control grids also have correct potentials, of drawing saturation current.

The control voltage supplied by the phase-comparison stage is set up across the network referred to in the anode circuit of tube 31 and is applied by way of resistors 40, 41 to the control grid of the triode portion of tube 42.

Both triodes of this tube are included in a known multivibrator circuit, so that the operation of this circuit need not be explained.

It is pointed out, however, that the frequency of the multivibrator circuit is determined inter alia by the value of the control voltage supplied.

At the output circuit of the multivibrator circuit-arrangement a saw-tooth voltage occurs and, moreover, a pulse voltage is present during the flyback.

This saw-tooth voltage of known form shown at 43 is applied by way of capacitor 44 and resistor 45 to the control grid of the line output tube 46.

The output circuit of this tube comprises the series-connection of a transformer winding 47 and capacitor 48. A tapping on this winding is connected to the cathode of a diode 49, whose anode is connected to the positive terminal of the source of anode voltage.

In this also known circuit-arrangement, the capacitor is charged to a voltage substantially corresponding to the sum of the anode supply voltage and the voltage set up through winding 47 across the lower portion of this winding during the up-stroke of the saw-tooth current.

The deflection coils of the cathode-ray tube of a television receiver are connected to a secondary winding 50.

A pulse voltage $V_{14}$ is taken from a unilaterally earthed secondary winding 52. This voltage $V_{14}$ is also shown in Fig. 4*c*.

If the saw-tooth deflection current through coil 51 has the correct frequency and phase, the start of the flyback just coincides with the leading edge of a synchronizing pulse. This state is shown in Fig. 4*c*.

The voltage $V_{14}$ from a supply having a very low internal resistance shock-excites the circuit $K_2$ comprising coil 53 and capacitor 54.

From capacitor 54 is taken the sine voltage $V_2$ lagging by exactly 90° behind the nominal frequency, which voltage is applied to the fifth grid of tube 31. This voltage $V_2$ is shown in Fig. 4*d*.

Owing to the setting of tube 31, anode current can only flow at instants at which the positive half cycles of the voltages $V_1$ and $V_2$ overlap each other.

This current is shown in Fig. 4*e*. The current strength does not substantially depend upon the momentary values of the voltages $V_1$ and $V_2$, but the duration of the time period, in which current is allowed to flow, is determined by the relative phase of the voltages $V_1$ and $V_2$.

Thus, the integrating network in the anode circuit of tube 31 supplies a control voltage whose value is also determined by the phase relation of the voltages $V_1$ and $V_2$.

To be complete it is pointed out that, for simplicity, the voltages and currents as shown in Fig. 4 are indicated for a state in which the phase angle $\phi_3$ is equal to zero.

Furthermore it is pointed out that, in the circuit-arrangement shown in Fig. 3, the grade of circuit $K_1$ can simply be controlled by the choice of the value of resistor 30. In circuit $K_2$ this can take place, for example, by connecting a resistor in parallel with capacitor 54.

Fig. 5 shows two curves indicating the relation existing between the frequency of the line synchronizing pulses, which is plotted horizontally in kc./sec., and the displacement of the image on a picture tube, which displacement is expressed as a percentage of the width of the image.

Curve *a* concerns a television receiver designed for a maximum line synchronizing frequency of 15.625 kc./sec., in which the circuit-arrangement according to the invention is not employed.

Curve *b* relates to a similar receiver utilizing the circuit-arrangement shown in Fig. 3.

As is seen from the drawing, substantially no raster displacement occurs with curve *b* if the frequency changes between 15.2 and 16.0 kc./s.

What I claim is:

1. Apparatus for synchronizing an oscillator in accordance with a pilot wave comprising a phase-comparison stage, means to apply a first wave derived from said pilot wave as an input to said stage, means including a phase-shifting network to apply a second wave derived from said oscillator as an input to said stage to compare in phase with said first wave whereby said stage develops a control voltage depending on the phase difference therebetween, said network comprising a resonant circuit tuned to the nominal fundamental frequency of said second wave for imparting a phase-shift to said second wave in a direction counteracting the phase displaced between said first and second waves, and means to apply said control voltage produced by said stage to said oscillator to effect said synchronism.

2. Apparatus for synchronizing a sawtooth oscillator in accordance with a pulsatory pilot wave comprising a phase-comparison stage, means to apply a first wave derived from said pilot wave as an input to said stage, means including a resonant circuit to apply a second wave derived from said oscillator as an input to said stage to compare in phase with said first wave whereby said stage develops a control voltage depending on the phase displacement therebetween, said resonant circuit being tuned to the nominal fundamental frequency of said sawtooth oscillator, and means to apply said control voltage to said oscillator to effect said synchronism.

3. Apparatus for synchronizing an oscillator in accordance with a pilot wave comprising a phase-comparison stage, means including a first phase shifting network to apply a first wave derived from said pilot wave to said stage, means including a second phase-shifting network to apply a second wave derived from said oscillator as an input to said stage, whereby said stage develops a control voltage depending on the phase difference therebetween, said networks comprising resonant circuits respectively tuned to the nominal fundamental frequencies of the respective waves therein for imparting phase-shifts to the first and second waves in a direction counteracting the phase displacement therebetween, said first network bringing about a smaller shift in said first wave than that brought about in said second wave by said second network, and means to apply said control voltage to said stage to effect said synchronism.

4. Apparatus for synchronizing a sawtooth wave oscillator with a pulsatory pilot wave comprising a phase-comparison stage, means including a first parallel-resonant circuit tuned to the nominal fundamental frequency of said pilot wave to derive a sinusoidal first voltage therefrom and to apply said first voltage as an input to said stage, means coupled to said oscillator to derive periodic pulses corresponding in time to the flyback of said sawtooth wave, means including a second resonant circuit tuned to the nominal fundamental frequency of said periodic pulses to derive a sinusoidal second voltage therefrom and to apply said second voltage as an input to said stage whereby said stage yields a control voltage as a function of the phase difference between said first and second voltages, and means to apply said control voltage to said oscillator to effect said synchronism.

5. Apparatus, as set forth in claim 4, wherein said second resonant circuit possesses a "Q" which is higher than that of said first resonant circuit.

References Cited in the file of this patent

UNITED STATES PATENTS

| | | |
|---|---|---|
| 2,065,565 | Crosby | Jan. 7, 1936 |
| 2,213,173 | Wheeler | Aug. 20, 1940 |
| 2,433,350 | Earp | Dec. 30, 1947 |
| 2,460,112 | Wright | Jan. 25, 1949 |
| 2,545,346 | Edelsohn | Mar. 13, 1951 |
| 2,551,308 | Adler | May 1, 1951 |
| 2,622,191 | Van Zelst et al. | Dec. 16, 1952 |